United States Patent [19]

Stouky et al.

[11] Patent Number: 4,925,496
[45] Date of Patent: May 15, 1990

[54] EVACUATION METHOD FOR MOTOR OPERATED VALVES LUBRICANT

[75] Inventors: R. Jon Stouky, Stuart; John T. Hayhurst, Dunedin, both of Fla.

[73] Assignee: Apex Technologies, Inc., Clearwater, Fla.

[21] Appl. No.: 189,925

[22] Filed: May 3, 1988

Related U.S. Application Data

[63] Continuation-in-part of Ser. No. 158,455, Feb. 22, 1988, abandoned.

[51] Int. Cl.⁵ .............................................. B08B 9/00
[52] U.S. Cl. .............................. 134/22.18; 134/22.19; 134/167 R; 134/169 R
[58] Field of Search .................... 134/10, 22.12, 22.14, 134/22.18, 22.19, 24, 40

[56] References Cited

U.S. PATENT DOCUMENTS

| | | | |
|---|---|---|---|
| 1,509,327 | 9/1924 | Winchester | 134/22.19 |
| 1,549,952 | 8/1925 | Anderson | 134/22.18 |
| 1,696,100 | 12/1928 | Osborne | 184/1.5 |
| 1,702,702 | 2/1929 | Osborne | 134/22.19 |
| 1,716,288 | 6/1929 | Wilderman | 134/24 |
| 2,011,811 | 8/1935 | Garnett | 134/22.19 |
| 2,665,772 | 1/1954 | Greer | 134/22.12 |
| 2,685,347 | 8/1954 | Busby | 134/10 |
| 2,691,380 | 10/1954 | Bartos | 134/113 |
| 3,308,840 | 3/1967 | Kelley | 134/167 R |
| 3,585,654 | 6/1972 | Jacobs | 4/490 |
| 4,140,543 | 2/1979 | Soleri | 134/22.18 |
| 4,361,282 | 11/1982 | DiVito | 239/381 |
| 4,479,612 | 10/1984 | Umbach et al. | 239/280 |

FOREIGN PATENT DOCUMENTS

| | | | |
|---|---|---|---|
| 622560 | 6/1961 | Canada | 134/10 |
| 2025982 | 12/1969 | France | |
| 540175 | 10/1941 | United Kingdom | 134/24 |
| 1400198 | 7/1975 | United Kingdom | 134/22.19 |

OTHER PUBLICATIONS

Copyright Registration No. TX 2 110 657; Robert Charles Lazell and Rene Ferdinand Kozak "Mov Operators Grease Removal and Replacement Procedure No.: AP–006"; May 5, 1987.

Primary Examiner—Asok Pal
Assistant Examiner—Ourmazd Ojan
Attorney, Agent, or Firm—Sybil Meloy

[57] ABSTRACT

A method for removing lubricant grease from enclosed gear train housings of motor operated valve, having one or more ports. First, bulk lubricant grease in the housing is removed by suction through an evacuation wand inserted into the housing. Second, remaining lubricant grease in the housing is mechanically dislodged and physically dissolved by flushing the housing with a solvent for the lubricant grease delivered through a fluid lance inserted into the housing. Third, any lubricant grease/solvent residue in the housing is removed by evacuation through one or more ports in the housing. The method can include rinsing the housing interior and partially drying the housing interior prior to any relubrication. The method can optionally include measuring and analyzing quantities of lubricant grease removed from the housing. A variety of flexible evacuation wands for use in the method can be easily attached to the source of the suction.

A fluid lance for use in the method can be an oscillating head, multi-port lance that automatically advances and retracts. The lance has a frame having a perforated drum head disposed of at one end of the frame. A rotating pneumatic motor is connected to the lance shaft via a rocker arm and cam causing oscillation of the lance parallel to the shaft of the motor. A channel in the lance from the handle thereof through the shaft to the drum is adapted for the passage of fluid through the handle and motor to the drum, permitting injection of a fluid through the oscillating drum at elevated temperatures or pressures or both.

8 Claims, 9 Drawing Sheets

EVACUATION METHOD FOR MOTOR OPERATED VALVES LUBRICANT

This application is a continuation-in-part of Ser. No. 158,455 filed Feb. 22, 1988, now abandoned.

BACKGROUND OF THE INVENTION

This invention relates to cleaning of enclosed gear train housings, particularly motor operated valve gear train housings and more particularly to methods and devices for cleaning and removing lubricant from such gear train housings without disassembly of the gear train.

Enclosed gear trains are used in conjunction with motor operated valves. A motor operated valve is a valve that is operated by a series of gears, which can be driven by a motor. The motor can be electric, pneumatic, or hydraulic, although the most prevalent type is an electric motor. The gears are chosen based on the application of the valve. The motor operated valve is used for the quick, remote operation of valves and for the operation of large valves. It can be actuated by manual application of power to the motor or by automatic application of power. The motor operated valve can also be manually operated using a hand wheel.

Motor operated valves can be obtained as motor operators. A motor operator can comprise a valve, a motor, a gear train, a torque limiting mechanism and a housing therefor. Such a motor operator combination is available commercially under the trademark LIMITORQUE, for nuclear power plant applications. The motor operator can function as follows: An electric motor turns the gears which amplify the torque to a point necessary to drive the valve stem between open and closed positions. The travel of the valve stem can be limited by limit switches and/or torque limiting (sensing) mechanisms that may be contained in or on the operating mechanism housing which contains the gears. Normally, the same lubricant that lubricates the gears also lubricates the torque limiting mechanism.

Motor operated valves generally operate on a non-continuous cycle. The valve operating mechanisms, such as LIMITORQUE, may be used to drive a variety of types and sizes of valves. These valves are normally used where remote control is necessary or desirable. Gear reduced high torque motors for this purpose are used in highly critical services such as in nuclear and other power plants, refineries, space vehicle launch facilities and the like.

Lubricants, normally heavy greases which may include complex chemicals, are used to lubricate the gear trains. The lubricant for use in a motor operated valve system is typically a grease which adheres to the gears and any torque limiting mechanism without the need for an external force to keep the grease in place on the gears and other mechanisms during normal operating conditions. As a result, the lubricating greases for use under ambient conditions are typically semi-solid or more consistent under ambient conditions. In general, the semi-solid or thicker greases are used for motor operated valves, namely, ones having a grade as measured by ASTM consistency grade 85-115 or more or National Lubricating and Grease Institute (NLGI) consistency grade of 6 or less. A preferred lubricant for use in the LIMITORQUE mechanism used in nuclear power plants is one having an NLGI grade equal to 0; for example, the grease sold as Nebula EPO (Exxon). In general, the grade of grease used is specified by the manufacturer of the motor operator. The term "lubricant grease" used here thus refers to a lubricant of naturally occurring and/or synthetic components having a consistency at temperatures and pressures under which the lubricant is used, i.e., under ambient conditions such that the lubricant grease adheres to the lubricated components without the need for an external force to contain the grease on the components to be lubricated. Lubricant grease is distinguished from a lubricant oil, which is unsuitable for use with a motor operated valve which requires a more consistent lubricant and whose housing would not retain the oil.

Over time, the lubricating capacity of the lubricants is reduced due to degradation resulting from radiation, age, humidity and other known causes. It is thus necessary to remove the lubricant from the gear train housing to facilitate relubrication. Relubrication can improve the predictability and life of the gear train. Improper valve operation or failure, which can be precipitated by reduced operability or failure of the gear drive due to inadequate lubrication, can cause unacceptable levels of risk or maintenance shutdown of the facility.

The ability, desire and means of effectively removing a large percentage of the lubricant from a motor operated valve or other heavy mechanical gear train housing is substantially influenced by the purpose of the gear train, the cost of facility shutdown for cleaning, hazards to service personnel, including radiation and steam or chemical explosion, alternatives to lubrication and relubrication and the risk of improper assembly if the valve gear train housing is open and disassembled to effect cleaning and inspection.

The enclosed gear train housings for motor operated valves or other heavy mechanical gear train housings used in commercial applications are typically cleaned and relubricated by removing the gear housing from the valve to a shop for disassembly or to disassemble the gear train in place and relubricate. Disassembly requires that the valve be out of operation for extended periods of time. This lack of operation results in the inability to operate other systems and equipment. Further, disassembly can result in incorrect reassembly.

The invention described herein provides an inexpensive and quick alternative for cleaning enclosed gear train housings for motor operated valves, in situ, without disassembling the gear train, which comprises cleaning the gear train housing in situ by removing bulk lubricant by suction, as an optional step, dislodging and dissolving any remaining lubricant with a fluid lance containing solvent for the lubricant, then removing any remaining lubricant/solvent mixture.

U.S. Pat. Nos. 1,549,952, 1,696,100, 2,011,811 and 3,308,840 all describe devices for automobile gear casings and other enclosed systems of automobiles. The gear lubricants used for automobile systems are liquids. The efficiency of the cleaning, namely, how much of the spent lubricant is removed, is not particularly critical in an automobile system. The lubricant used within a gear train housing for a motor operated valve is a grease. The difference in form is due to the fact that the gears involved are high torque gears requiring thick lubricants, in a solid or semi-solid form rather than liquid form. In addition, because these motor operated valves are used in essential services such as nuclear and other power plants, refineries, space vehicle launch facilities and the like, where lubricant failure can result in shutdown of the facility, it is absolutely essential that cleaning efficiency be greater than 90% and preferably almost 100%. The cited prior art does not use in-place cleaning for enclosed gear trains of motor operated valves or high torque gears which utilize a lubricant grease. It has been surprisingly found that the method of this invention can have a cleaning efficiency in excess of 99%.

U.S. Pat. No. 2,685,347 and French Patent No. 2,025,982 relate to cleaning of gear cases in oil field applications. Here again, the lubricant is an oil, as seen from the passage in column 1, lines 11-15, of U.S. Pat. No. 2,685,347.

U.S. Pat. Nos. 2,691,380, 4,361,282 and 4,479,612 all relate to various types of flushing tools. U.S. Pat. No. 2,665,772 relates to a lubrication system having a pressured feed and suction. U.S. Pat. No. 3,585,654 relates to a quick-disconnect joining element.

SUMMARY OF THE INVENTION

A method of removing lubricant grease from an enclosed gear train housing of a motor operated valve in which the housing contains at least one aperture in communication with the lubricated surfaces comprising the steps of (a) optionally inserting an evacuation wand into the housing, and removing lubricant grease by application of suction through the evacuation wand, (b) inserting fluid injection apparatus into said housing, (c) supplying fluid solvent to said fluid injection apparatus and (d) establishing a fluid solvent stream from said fluid injection apparatus to the interior of said housing to physically remove said lubricant, and (e) removing any remaining solvent/lubricant. The method can be used with a new high pressure fluid lance, which comprises a lance, including an oscillating head and a handle at the other end, an interior bore extending through the length from the head to the handle, a pneumatic cylinder for advance and withdrawal, a plurality of apertures in said head, and a pneumatic motor connected to said lance by a rocker arm and cam; and a passageway from said opening in said handle for passage of a fluid under pressure from said handle through said lance into said head and outward therefrom.

DESCRIPTION OF THE PREFERRED EMBODIMENT

Figure 1:
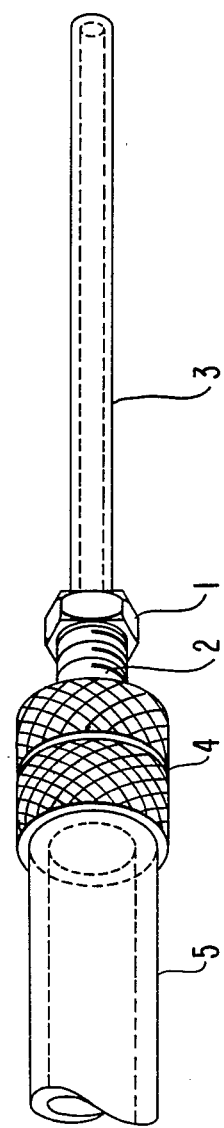
FIG. 1 is a perspective view of the flexible evacuation wand.

Referring now to the drawings, and particularly to FIG. 1, a perspective view of the evacuation wand is shown. Use of the evaluation wand to evacuate bulk solvent is an optional step in the method of this invention. Use of this optional step tends to reduce the amount of solvent or time needed to dissolve the lubricant in the next step. The evacuation wand comprises a frame 1 having an interior bore 2, a head at one end and a full port quick disconnect 4 at the other end. At one end of frame 1 is a flexible suction tube 3, axially disposed within the head of frame 1 and extending through the interior bore 2 of frame 1 to the full port quick disconnect 4. Disposed a the opposite end of frame 1 connected to full port quick disconnect 4 is vacuum hose 5. Disposed at the other end of vacuum hose 5 is a full port quick disconnect, which is connected to the vacuum system shown in FIG. 2.

Figure 2:
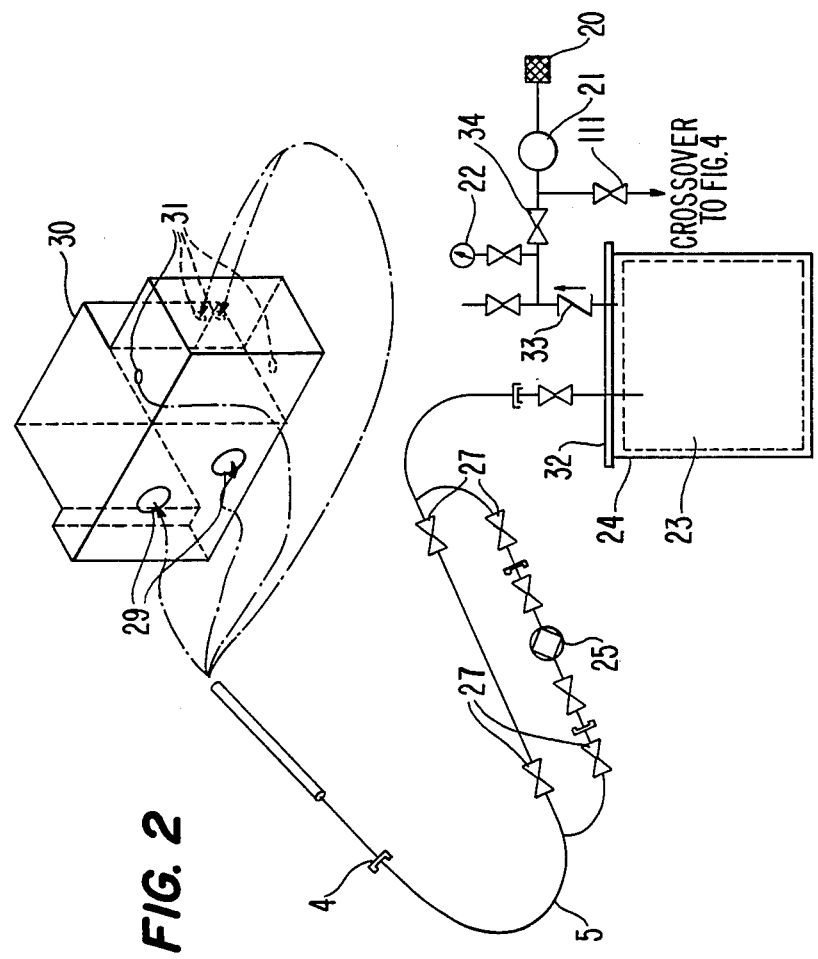
FIG. 2 is a schematic drawing of the valve lubricant recovery vacuum system.

Suction tube 3 of the evacuation wand illustrated in FIG. 1 is sized to enter the access holes 29 and 31 found on enclosed gear trains for motor operated valves, as more fully described in FIG. 2.

The evacuation wand can be manually manipulated to contact the entrained lubricant.

FIG. 2 is a schematic drawing of the valve lubricant recovery vacuum system of this invention.

The valve gear train housing 30 is shown in FIG. 2. For clarity, the gear train which lies within the housing is not shown in the illustration.

Figure 3:
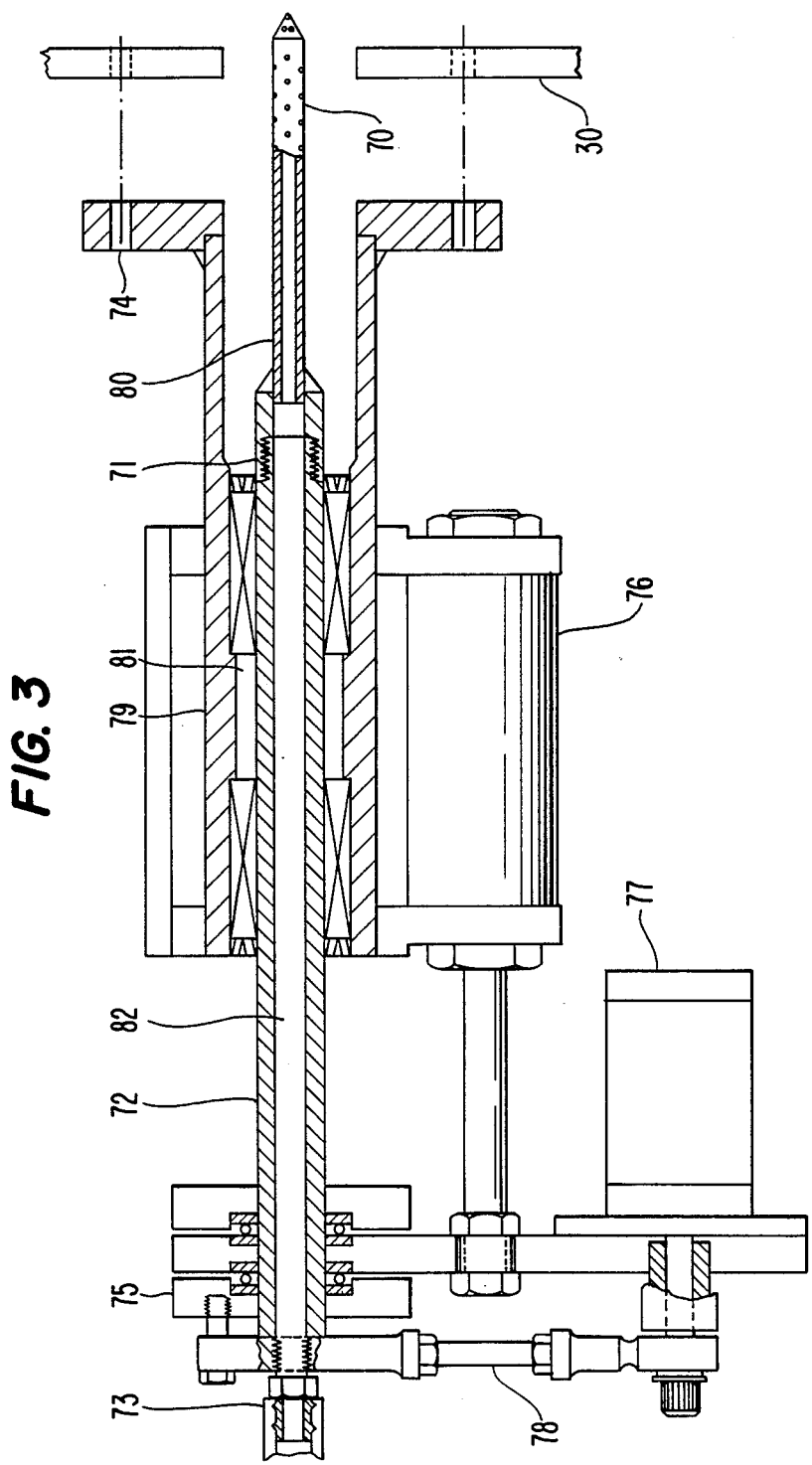
FIG. 3 is a plan view of the oscillating high pressure lance showing its relationship to the gear train housing prior to insertion.

The valve gear train housing 30 of FIG. 2 contains at least one port 29, which can serve as an entry port for the lance shown in FIG. 3, and at least one opening 31, which can serve as a drain. A vacuum pump 21 takes a suction on waste tank 24 and causes lubricant to pass through the evacuation wand 1 through vacuum hose 5 and be deposited in the waste tank liner 23 for disposal. By manipulation of isolation valves 27 an unadulterated sample of lubricant can be trapped in sample collection vial 25 for further analysis.

Motor operated valve gear train housings normally contain ports 29 which serve in normal operation for entry of valve position actuators, used with position indicators, in limit switch panels, all of which are not illustrated in the figures. Removal of the valve position indicators provides access to ports 29 for use as lance entry ports. Any coverings for openings 31 used in normal operations are removed in preparation for cleaning.

The lance of FIG. 3 is sized to provide for easy access by its head 70 shown in FIG. 3.

The lance of FIG. 3 comprises a lance frame 79. The interior of the frame 79 contains a channel 81 through which a lance 72 can pass. The lance 72 can accept an adaptive fixture 71 which contains a tube 80 and integral lance head 70. The channel 82 through which fluid can pass, extends from a self-sealing disconnect 73 through to lance head 70, and contains a plurality of apertures through which fluid can pass.

The lance 72 is advanced into and retracted from the valve gear train housing using the air cylinder 76. During advancement and retraction the lance 72 is oscillated by air motor 77 via a rocker ar 78 and cam 75.

Figure 4:
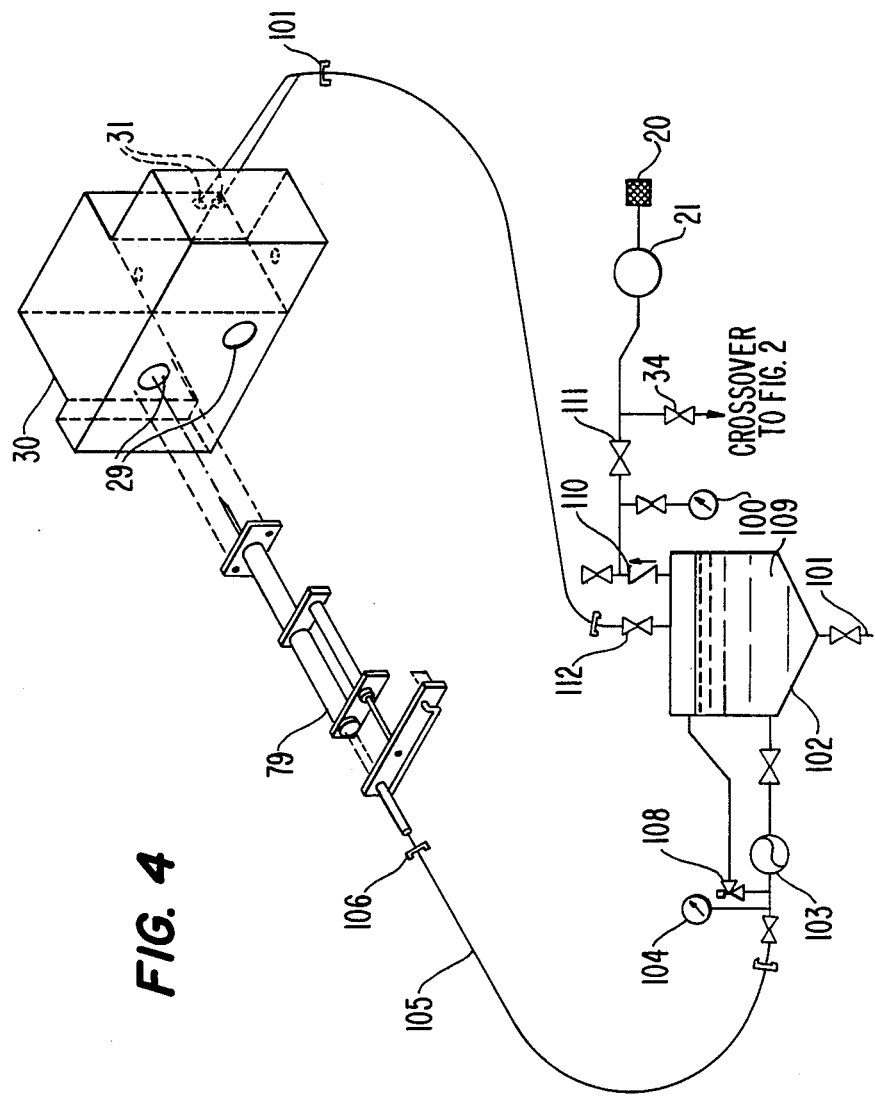
FIG. 4 is a schematic drawing of the solvent recirculation system.

Following optional removal of the bulk lubricant with the evacuation wand shown in FIG. 1, as shown as FIG. 2, remaining lubricant is removed using the fluid lance of FIG. 3. Specifically, a solvent for the lubricant is supplied via the lance of FIG. 3, as shown in FIG. 4, the lance 72 is inserted into limit access switch holes. The lubricant solvent is then supplied to the lance and then applied to the interior of the housing to mechanically break up and partially, or totally, dissolve any remaining lubricant so that the lubricant can be readily evacuated from the gear train housing.

Referring to FIG. 2, in cleaning the enclosed gear train housing 30, the evacuation wand of FIG. 1 is used to remove bulk lubricant. The wand shown in FIG. 1 is inserted into ports 29 and 31 of valve gear train housing 30.

The evacuation wand of FIG. 1, in place as shown in FIG. 2 is actuated to remove the bulk lubricant. Referring to FIG. 1, the suction tube of the evacuation wand is sized to fit through holes 31 and to extend into the valve gear train housing 30 shown in FIG. 2. The wand assembly of FIG. 1 includes a quick disconnect mounting 4, which is connected to the vacuum system, as shown in FIG. 2, via hose 5 of FIG. 2.

Referring to FIG. 2, bulk lubricant is optionally removed from valve gear train housing 30 by application of the vacuum pump to the evacuation wand of FIG. 1 via hose 5, which is connected to fitting 4 shown in FIG. 1.

Referring also to FIG. 2, the bulk lubricant is removed from the valve gear train housing 30 via hose 5 into waste tank 24, which has integral removable disposable liner 23 and a removable top 32. Vacuum is provided by mechanical vacuum pump 21, capable of producing vacuum pressures of 2 to 26 inches of mercury at high volume flows. The exhaust of the vacuum pump 21 is processed through filter/flame arrestor 20 to prevent discharge of entrained lubricant in the exhaust system, which can result in fire or explosion. A check valve 33 prevents back flow of air. Alternatively, a single three-way valve incorporating valves 34 and 111 can be used to isolate the solvent tank from the wate tank. Then when the waste tank is on line, back pressure is minimized. Manual valve 34 isolates the pump. Vacuum gauge 22 provides information on the condition of the system.

The evacuation wand, in addition to being used for removing bulk solvent, can be used to remove the residues formed by other processes used in the gear train housing.

Following the removal of bulk lubricant from the gear train housing, the housing must be injected with acceptable light solvent or other cleaning solution to remove remaining lubricant, which removal is facilitated by the use of the oscillating high pressure lance of FIG. 3. The purpose of the lance is to mechanically break up and partially or totally dissolve the remaining lubricant so that it can be readily evacuated from the gear train housing.

The lance 72 is an oscillating lance with a perforated head 70, as seen in FIG. 3, which, when oscillated radially and filled with solvent under elevated pressure, will spray small streams of pressurized solvent throughout the gear train housing 30 to mechanically break or dissolve remaining lubricant. The perforated head is sealed at one end, and fitted with a hollow shaft 72 and 80. A flexible hose 105 and quick disconnect coupling 106 provide for rapid attachment to the solvent injection system shown in FIG. 4.

The lance 72 is advanced and retracted using air cylinder 76, which is supplied by a control air system. The stroke of air cylinder 76 is sized to permit full penetration of valve gear train housing 30. During the advance and withdrawal cycle the lance head 70 and lance shaft are oscillated by air motor 77 via rocker arm 78 and cam 75. Air motor 77 is supplied by control air such that it provides oscillation speed equivalent of 25 to 200 revolutions per minute.

The location and number of perforations in lance head 70 are installed to achieve very high (100–200 psig (pounds per square inch above atmospheric pressure)) perforation pressure in routine operation.

Referring to FIG. 4, the solvent 109, which may be a petroleum aliphatic solvent for petroleum based heavy machinery lubricants (Varsol 18, Humble Oil and Refining) or other cleaning solvents approved by the owner for the service, is pumped to the gear train housing 30 through lance head 70 by an air driven solvent pump 103. A pressure relief valve 108 is provided to prevent over pressurization of hose 105. Pressure gauge 104 permits monitoring of solvent pump 103 output. Self-sealing quick disconnect 106 connects the hose to the lance shaft and permits solvent to reach the lance head.

Solvent that is introduced into the valve gear train housing through limit switch access hole 29 exits through access drain holes 31 and drains back into the solvent tank 102. The motive force can be gravity or vacuum assisted by vacuum pump 21. The exhaust of the vacuum pump 21 passes through filter/flame arrestor 20 to prevent discharge of entrained solvent in the exhaust system, which can result in fire or explosion. A check valve 110 prevents back flow of air. Manual valve 111 isolates the pumps. Vacuum gauge 100 provides information on the condition of the vacuum system.

When the solvent becomes saturated with lubricant, it can be drained through valve 101 and the tank refilled through valve 112.

Some applications may require a dynamic system to remove solvent vapors and remaining liquids. This must be done with a suitable carrier (hot dry air) with an ability (in certain cases) to assure that the hot solvent-vapor-laden exhaust will not ignite or explode.

Figure 5:
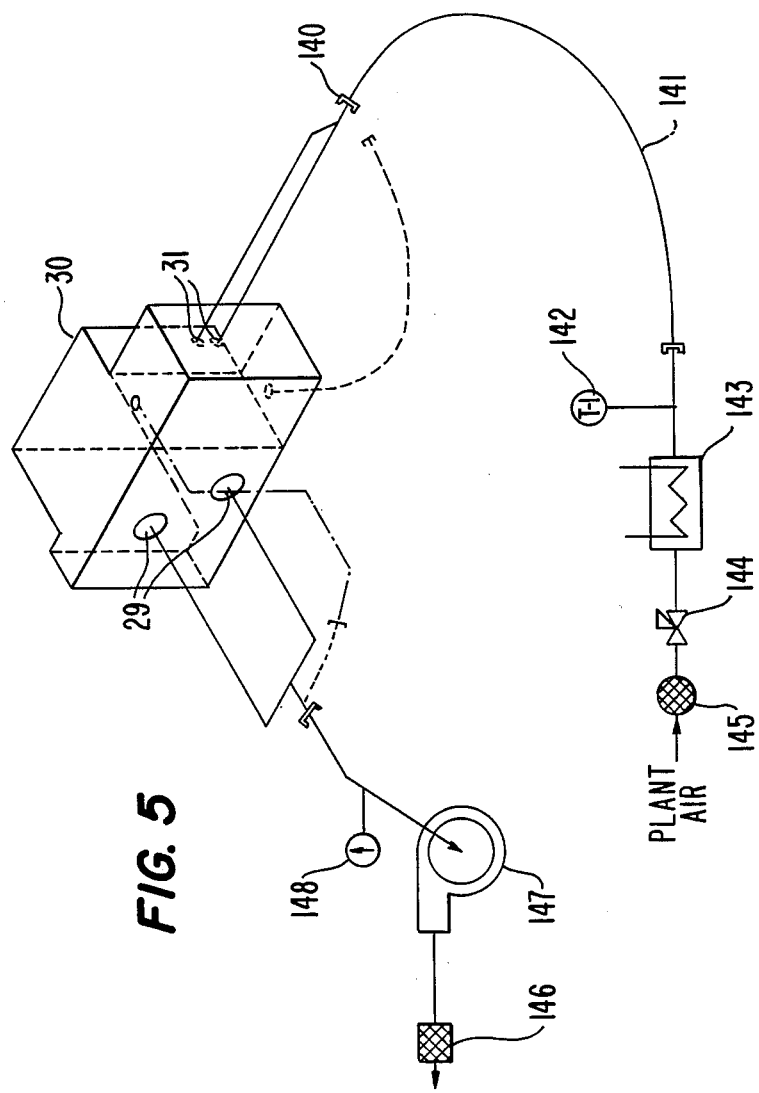
FIG. 5 is a schematic drawing of the drying air system.

A drying air system shown in FIG. 5 may be supplied to achieve these objectives. The drying air injection system of FIG. 5 includes a filter/drier 145, regulator 144, electric air heater 143, and discharge hose 141 to deliver dry hot air to the gear train housing 30 through the existent fill and drain ports 31 or other appropriate entry points.

The hot solvent vapor in the gear train housing 30 is maintained at a pressure less than that of the ambient environment through use of a blower 147. The drying air exhaust system consists of outlet lines 131 to a blower 133, and flame arrestor 146. Associated pressure and temperature gauges are provided to assure safe efficient operation. The air is educated by the blower and the gases discharged through the flame arrestor.

FIGS. 6 through 9 are schematic drawings of the motor operator within the gear train housing of FIGS. 2 and 4. The motor operator shown is sold under the trademark LIMITORQUE SMB-00 and has special application for use with valves for fluids used in nuclear power plants.

Figure 6:
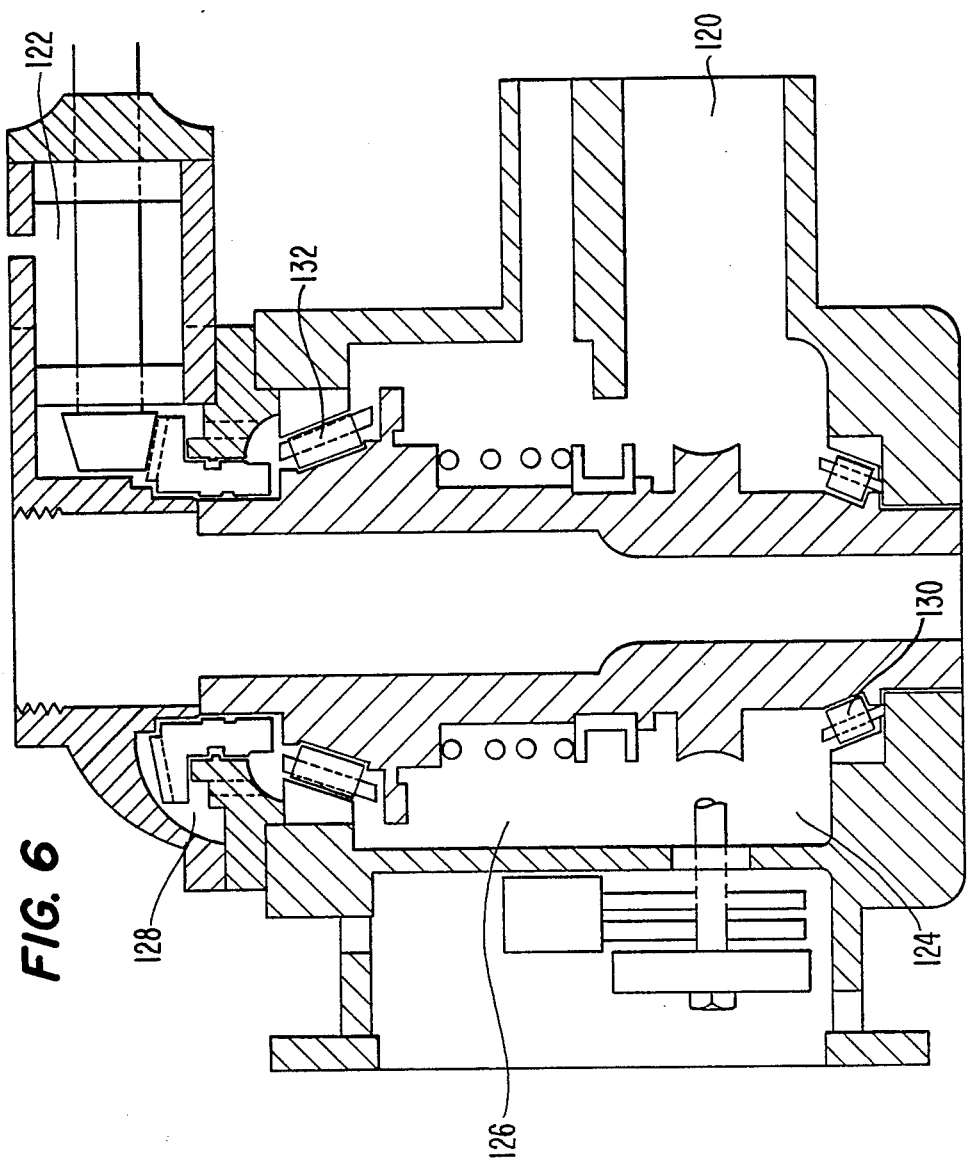
FIG. 6 through 9 are schematic drawings of the motor operator within the gear train housing of FIGS. 2 and 4.
Figure 7:
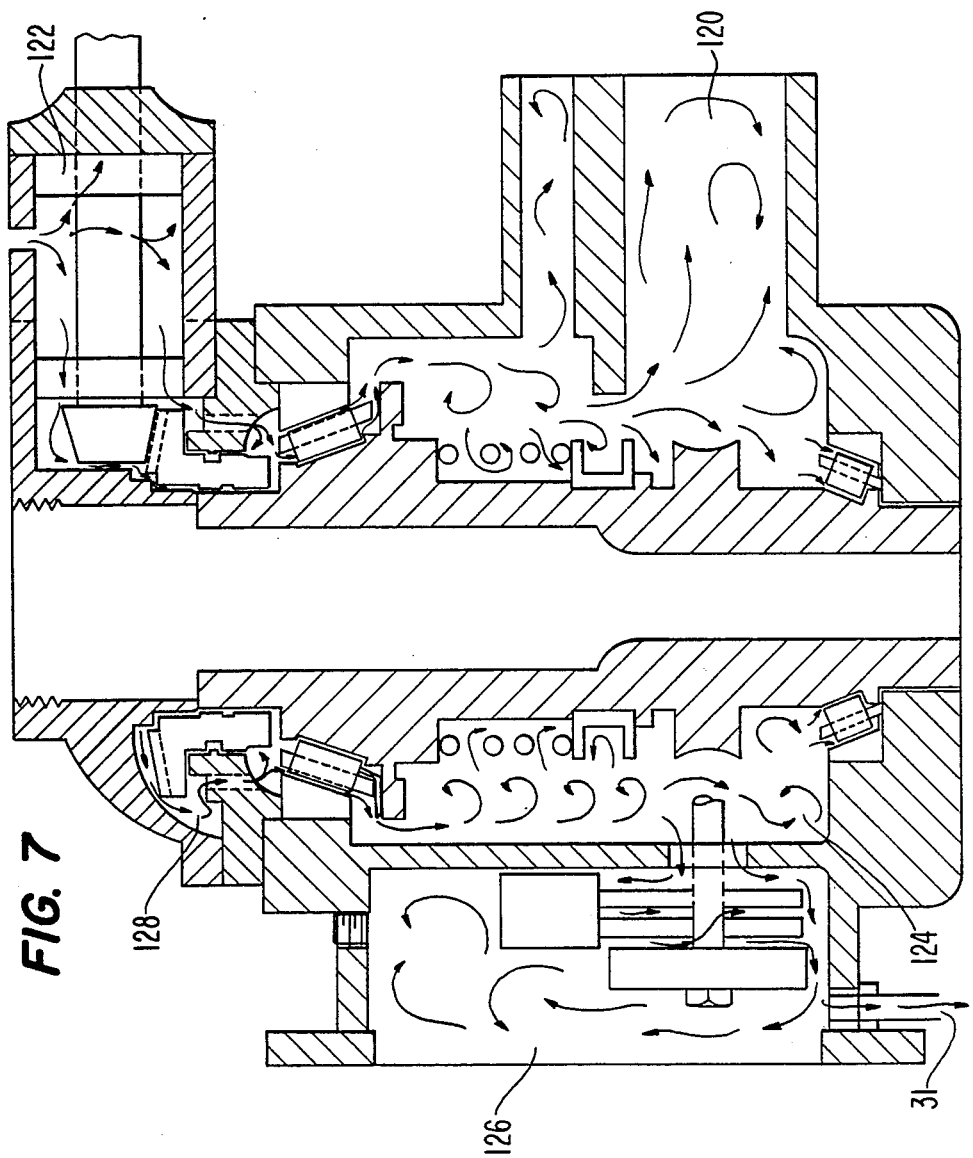

FIGS. 6 to 9 show a front view, in-section of the gear train housing of the motor operator within the valve gear train housing shown in FIGS. 2 and 4. Referring to FIG. 6, the motor operator is multi-cavitied and contains various cavities 120, 122, 124, 126 and 128. Cavity 120 in operation contains the spring pack used with the motor operator. The spring pack is removed prior to delubrication and relubrication. Cavity 122 contains a hand wheel used to operate the valve. Cavity 126 is the main cavity of the valve. Cavity 126 communicates with the motor used to open and close the valve when the valve is in use. The main cavity 124 terminates in a lower bearing 130. The spring pack cavity 120 terminates on its upper portion with an upper bearing 132. FIG. 7 shows a path of the fluid solvent used to clean the housing when inserted into the aperatures 29 and 31 of the gear train housing 30, using lance 79, as shown in FIG. 4. The solvent can be removed through drain ports 31, shown in FIG. 7, as well as additional drain ports in the mechanism not shown in the drawing of FIG. 7.

Figure 8:
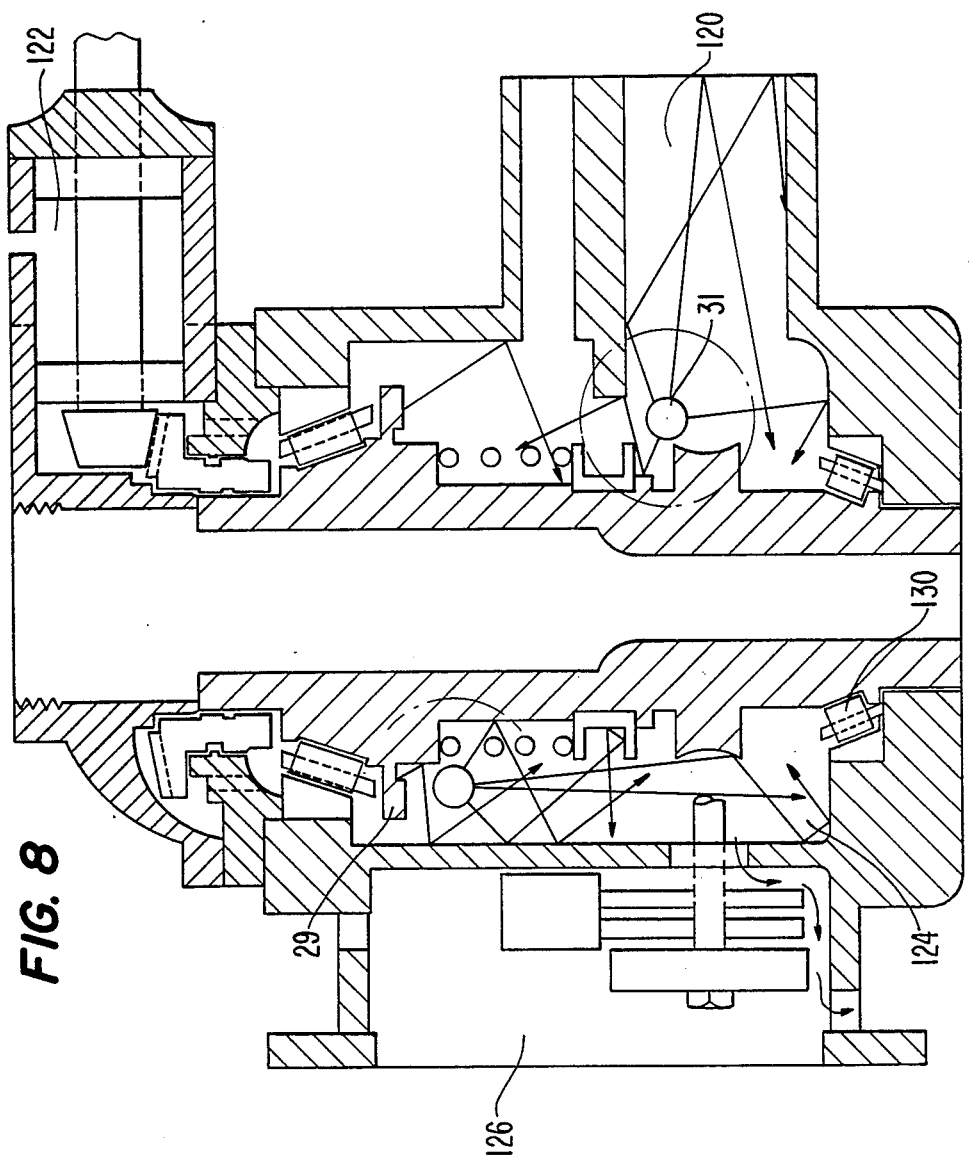

FIG. 8 illustrates the position of limit switch access holes 29 with reference to the cavities, as well as additional patterns for solvent flow from the lance 79 through holes 29, into the cavities 120, 122, 124, 126, and 128.

Figure 9:
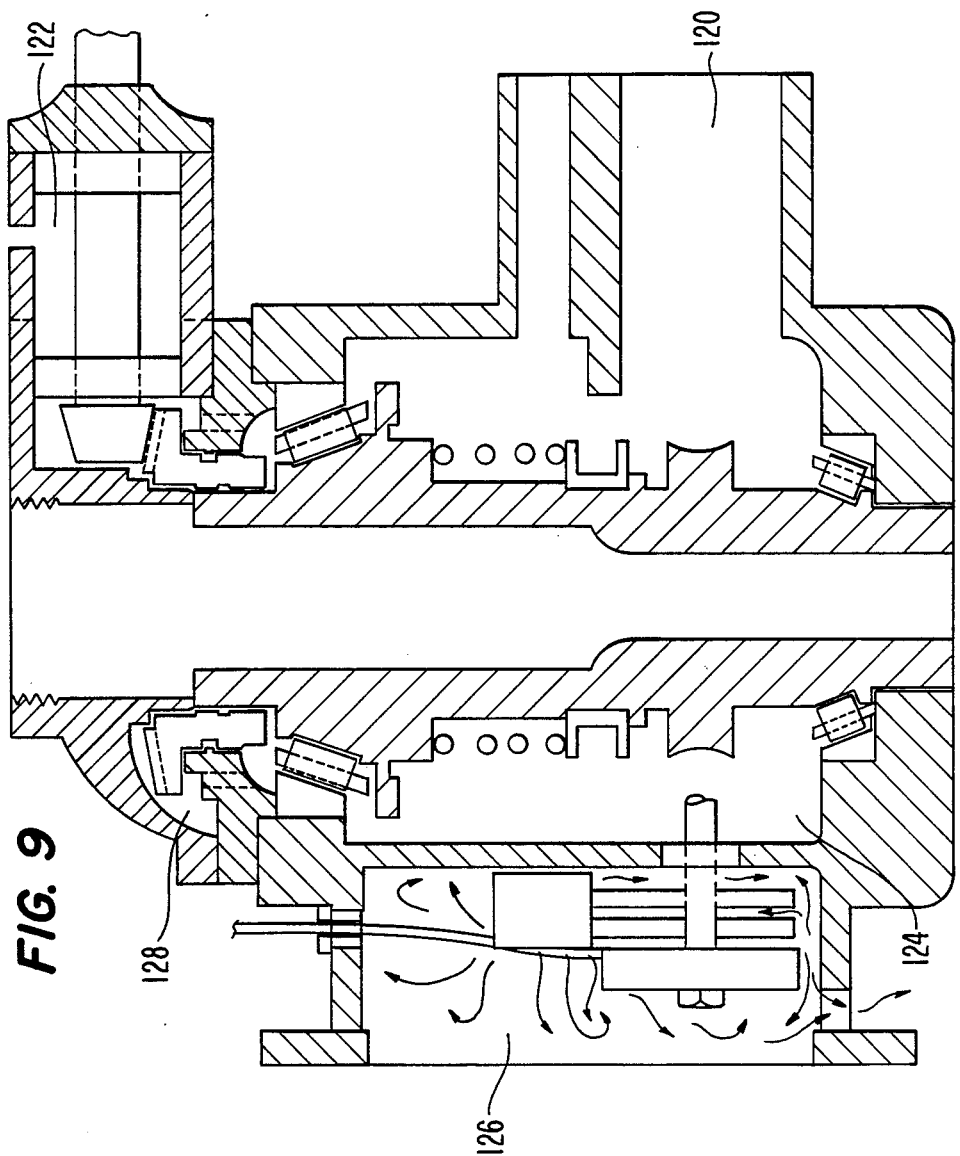

FIG. 9 also illustrates a solvent path.

While preferred forms of this invention have been specifically illustrated and described herein, it will be apparent to those skilled in the art that other modifications and improvements may be made to the forms herein specifically disclosed. Accordingly, the present invention is not to be limited to the forms herein specifically disclosed, or in any other way inconsistent with the progress in the art promoted by this invention.

What is claimed is:

1. A method of removing lubricant grease being semisolid or more consistent under ambient conditions, without the need of an external force to contain the same and having a National Lubricating and Grease Institute consistency of less than six from an enclosed multi-cavity gear train housing of a motor operated valve in which the housing contains at least one aperture in communication with lubricated surfaces comprising the steps of:
    inserting fluid injection powered to deliver fluid under elevated pressures, to cyclically advance and retract or to oscillate and to deliver streams of fluid apparatus into said housing;
    supplying fluid solvent to said fluid injection apparatus;
    establishing a fluid solvent stream from said fluid injection apparatus to the interior of said housing to physically remove said lubricant grease; and
    evacuating any remaining lubricant grease and solvent from the housing.

2. A method of removing lubricant grease being semisolid or more consistent under ambient conditions, without the need of an external force to contain the same and having a National Lubricating and Grease Institute consistency of less than six from an enclosed multi-cavity gear train housing of a motor operated valve in which the housing contains at least one aperture in communication with lubricated surfaces comprising the steps of:
    inserting an evacuation wand into said housing, said evacuation wand having an internal bore extending substantially the length of the wand, with one end of the bore at one end of the wand and the opposite end of the bore adapted to communicate with a source of suction;
    removing lubricant grease through one end of the wand by application of suction through a bore in the opposite end of the wand;
    inserting fluid injection powered to deliver fluid under elevated pressures, to cyclically advance and retract or to oscillate and to deliver streams of fluid apparatus into said housing;
    supplying fluid solvent to said fluid injection apparatus;
    establishing a fluid solvent stream from said fluid injection apparatus to the interior of said housing to physically remove said lubricant grease; and evacuating any remaining lubricant grease and solvent from the housing.

3. The method of claim 2, in which the fluid solvent is injected at elevated pressure.

4. The method of claim 2 in which the fluid solvent is injected at elevated temperatures.

5. The method of claim 2, in which the fluid injection apparatus has a plurality of apertures and fluid injection apparatus is oscillated at 25 to 200 revolutions per minute.

6. The method of claim 2, in which the housing is dried by circulation of heated air through the housing after removal of the lubricant grease and solvent mixture.

7. A method of removing lubricant grease being semisolid or more consistent under ambient conditions, without the need of an external force to contain the same and having a National Lubricating and Grease Institute consistency of less than six from an enclosed multi-cavity gear train housing of a motor operated valve in which the housing contains at least one aperture in communication with lubricated surfaces comprising the steps of:
    inserting an evacuation wand into said housing, said evacuation wand having ahead at one end and means adapted to communicate with a source of suction at the other end, and having an internal bore extending from the head to the means for communicating with the source of suction at the other end;
    removing lubricant grease through the head of the wand by application of suction to the bore;
    inserting fluid injection powered to deliver fluid under elevated pressures, to cyclically advance and retract or to oscillate and to deliver streams of fluid apparatus into said housing, said fluid injection apparatus having a plurality of apertures for delivery of the fluid into the housing and being capable of oscillating movement;
    supplying fluid solvent to said fluid injection apparatus under elevated pressure;
    establishing a fluid solvent stream from said fluid injection apparatus under elevated pressure to the interior of said housing through the plurality of apertures on the injection apparatus and with oscillating movement of the apparatus during application of the fluid solvent stream; and
    evacuation of any remaining lubricant grease and solvent from the housing.

8. The method of claim 7 in which the housing is dried by circulation of heating air through the housing after removal of the lubricant grease and solvent mixture.

* * * * *